(12) United States Patent
Proudler

(10) Patent No.: US 8,909,555 B2
(45) Date of Patent: Dec. 9, 2014

(54) INFORMATION SECURITY SYSTEM

(75) Inventor: Graeme John Proudler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2936 days.

(21) Appl. No.: 10/296,557

(22) PCT Filed: Apr. 22, 2002

(86) PCT No.: PCT/GB02/01856
§ 371 (c)(1),
(2), (4) Date: Nov. 22, 2002

(87) PCT Pub. No.: WO02/086684
PCT Pub. Date: Oct. 31, 2002

(65) Prior Publication Data
US 2003/0110372 A1    Jun. 12, 2003

(30) Foreign Application Priority Data

Apr. 24, 2001 (GB) .................................. 0110131.0
Nov. 20, 2001 (GB) .................................. 0127735.9

(51) Int. Cl.
*G06Q 20/00* (2012.01)
*G06F 21/50* (2013.01)

(52) U.S. Cl.
CPC ........ *G06F 21/50* (2013.01); *G06F 2221/2105* (2013.01); *G06F 2221/2141* (2013.01); *G06F 2221/2153* (2013.01)
USPC ............................... 705/64; 713/164; 726/22

(58) Field of Classification Search
USPC ..................................................... 705/51, 64
See application file for complete search history.

(56) References Cited

U.S. PATENT DOCUMENTS

| 4,562,306 | A | 12/1985 | Chou et al. ................. 178/22.08 |
| 4,918,653 | A | 4/1990 | Johri et al. ...................... 726/23 |
| 5,008,936 | A | 4/1991 | Hamilton et al. ............. 380/281 |
| 5,355,414 | A | 10/1994 | Hale et al. ........................ 726/34 |
| 5,359,659 | A | 10/1994 | Rosenthal ........................ 726/24 |
| 5,361,359 | A | 11/1994 | Tajalli et al. .................. 395/700 |

(Continued)

FOREIGN PATENT DOCUMENTS

| EP | 0 421 409 A | 4/1991 |
| EP | 0 580 350 A1 | 1/1994 |

(Continued)

OTHER PUBLICATIONS

Neuman, B.C., et al., "Kerberos: An Authentication Service for Computer Networks," *IEEE Communications Magazine*, pp. 33-38 (Sep. 1994).

(Continued)

*Primary Examiner* — Jamie Kucab

(57) ABSTRACT

An information security system is disclosed having a considerably simplified access control infrastructure. The number of secrets in a computer system domain is reduced to a minimum, yet individual users may still be identified and access to applications may still be individually controlled. The trusted entity in each of a plurality of platforms (100, 200, 202, 203) of the computer system may store an identity secret of the platform (100, 200, 202, 203) and may be trusted to use that secret in conjunction with an information label only when the platform (100, 200, 202, 203) is running the correct software to provide and/or take part in a particular service associated with that information label.

19 Claims, 7 Drawing Sheets

(56) References Cited

U.S. PATENT DOCUMENTS

| | | | |
|---|---|---|---|
| 5,390,297 A | 2/1995 | Barber et al. | 726/29 |
| 5,406,624 A | 4/1995 | Tulpan | 713/192 |
| 5,473,692 A | 12/1995 | Davis | |
| 5,517,569 A | 5/1996 | Clark | 380/52 |
| 5,533,126 A | 7/1996 | Hazard | 713/187 |
| 5,680,547 A | 10/1997 | Chang | |
| 5,825,879 A | 10/1998 | Davis | 380/216 |
| 5,870,723 A | 2/1999 | Pare et al. | 705/39 |
| 5,903,732 A | 5/1999 | Reed et al. | 395/200.59 |
| 5,933,498 A | 8/1999 | Abrams et al. | 380/4 |
| 5,937,159 A * | 8/1999 | Meyers et al. | 726/20 |
| 5,943,423 A | 8/1999 | Muftic | 705/67 |
| 5,990,927 A | 11/1999 | Hendricks et al. | 725/132 |
| 5,991,399 A | 11/1999 | Graunke et al. | 380/279 |
| 6,006,332 A | 12/1999 | Christian et al. | 713/201 |
| 6,023,765 A | 2/2000 | Kuhn | 713/200 |
| 6,028,933 A | 2/2000 | Heer et al. | 713/169 |
| 6,091,835 A | 7/2000 | Smithies et al. | 382/115 |
| 6,092,147 A | 7/2000 | Levy et al. | 711/6 |
| 6,092,202 A | 7/2000 | Veil et al. | 713/201 |
| 6,157,719 A | 12/2000 | Wasilewski et al. | 380/210 |
| 6,219,788 B1 | 4/2001 | Flavin et al. | 713/194 |
| 6,236,971 B1 | 5/2001 | Stefik et al. | 705/1 |
| 6,246,767 B1 | 6/2001 | Akins et al. | 380/210 |
| 6,266,416 B1 | 7/2001 | Sigbjørnsen et al. | 380/255 |
| 6,289,462 B1 * | 9/2001 | McNabb et al. | 726/21 |
| 6,307,939 B1 | 10/2001 | Vigarie | 380/210 |
| 6,327,652 B1 | 12/2001 | England et al. | 713/2 |
| 6,330,670 B1 | 12/2001 | England et al. | 713/2 |
| 6,343,280 B2 | 1/2002 | Clark | 705/55 |
| 6,363,488 B1 | 3/2002 | Ginter et al. | 726/1 |
| 6,378,072 B1 | 4/2002 | Collins et al. | 713/187 |
| 6,463,474 B1 | 10/2002 | Fuh et al. | 709/225 |
| 6,477,648 B1 | 11/2002 | Schell et al. | 726/22 |
| 6,499,110 B1 | 12/2002 | Moses et al. | 726/1 |
| 6,510,513 B1 | 1/2003 | Danieli | 713/156 |
| 6,609,199 B1 | 8/2003 | DeTreville | 713/187 |
| 6,697,948 B1 | 2/2004 | Rabin et al. | 726/30 |
| 6,775,779 B1 | 8/2004 | England et al. | 726/26 |
| 6,820,063 B1 | 11/2004 | England et al. | 705/54 |
| 6,857,067 B2 | 2/2005 | Edelman | 713/155 |
| 6,988,250 B1 * | 1/2006 | Proudler et al. | 713/160 |
| 7,069,439 B1 * | 6/2006 | Chen et al. | 713/172 |
| 7,124,938 B1 | 10/2006 | Marsh | 235/382 |
| 7,437,568 B2 * | 10/2008 | Das-Purkayastha et al. | 713/187 |
| 2002/0010684 A1 * | 1/2002 | Moskowitz | 705/75 |
| 2002/0012432 A1 | 1/2002 | England et al. | 380/231 |
| 2002/0019934 A1 | 2/2002 | Ishizaki | |
| 2002/0188763 A1 * | 12/2002 | Griffin | 709/310 |
| 2003/0005289 A1 | 1/2003 | Gougeon et al. | 713/156 |
| 2003/0056054 A1 | 3/2003 | Levy et al. | 711/6 |
| 2003/0196085 A1 | 10/2003 | Lampson et al. | 713/156 |
| 2003/0196119 A1 | 10/2003 | Raley et al. | 713/201 |
| 2007/0028113 A1 * | 2/2007 | Moskowitz | 713/176 |

FOREIGN PATENT DOCUMENTS

| | | |
|---|---|---|
| EP | 0 684 538 A | 11/1995 |
| EP | 0 717 337 A1 | 6/1996 |
| EP | 0 849 657 A | 6/1998 |
| EP | 0 895 148 A1 | 2/1999 |
| EP | 1 041 481 A2 | 10/2000 |
| EP | 1 076 279 A1 | 2/2001 |
| EP | 1 081 891 A2 | 3/2001 |
| EP | 02255245.9 | 7/2002 |
| GB | 2 267 631 A | 12/1993 |
| GB | 2 317 476 A | 3/1998 |
| GB | 0020441.2 | 8/2000 |
| GB | 2 365 160 A | 2/2002 |
| GB | 2 372 343 A | 8/2002 |
| GB | 2 372 594 A | 8/2002 |
| GB | 2 372 595 A | 8/2002 |
| JP | 10-333902 | 12/1998 |
| JP | 2001 148037 | 11/1999 |
| WO | 93/24906 | 12/1993 |
| WO | 95/27249 | 12/1995 |
| WO | 95/33239 A1 | 12/1995 |
| WO | 98/36517 | 8/1998 |
| WO | 98/36517 A | 8/1998 |
| WO | 98/44402 A | 10/1998 |
| WO | 9844402 A1 | 10/1998 |
| WO | 00/31644 | 6/2000 |
| WO | 00/45241 A2 | 8/2000 |
| WO | 00/48063 | 8/2000 |
| WO | WO 00/54125 * | 9/2000 ............... G06F 1/00 |
| WO | 00/58859 | 10/2000 |
| WO | 01/01224 A1 | 1/2001 |
| WO | 01/27722 A1 | 4/2001 |
| WO | 01/46785 | 6/2001 |
| WO | 01/65366 A1 | 9/2001 |
| WO | 01/95071 A2 | 12/2001 |

OTHER PUBLICATIONS

Schneck, P.B., "Persistent Access Control to prevent piracy of digital information," *Proceedings of the IEEE*, vol. 87, No. 7, pp. 1239-1250 (Jul. 1999).

Yee, B., "Using Secure Coprocessors," Doctoral thesis—Carnegie Mellon University, pp. 1-94 (May 1994).

"Building a Foundation of Trust in the PC," *Trusted Computing Platform Alliance*, pp. 1-7 (Jan. 2000).

"Information technology—Security techniques—Entity authentication; Part 3: Mechanisms using digital signature techniques," *ISO/IEC 9798-3*, Second Edition, pp. 1-6 (1998).

"Information technology—Security techniques—Key management—Part 3: Mechanisms using asymmetric techniques," *ISO/IEC 11770-3*, pp. 1-34 (1999).

*Trusted Computing Platform Alliance (TCPA), Main Specification*, Version 1.0, pp. 1-284 (2000).

*Trusted Computing Platform Alliance (TCPA), TCPA Design Philosophies and Concepts*, Version 1.0, <www.trustedpc.org> pp. 1-30 (Jan. 2001).

Ashley, P., et al., "Using SESAME to Implement Role Based Access Control in Unix File Systems," *Proceedings IEEE*, pp. 141-146 (Jun. 8, 1999).

U.S. Appl. No. 10/049,211, Pearson et al., filed Feb. 5, 2002.
U.S. Appl. No. 10/049,213, Pearson et al., filed Feb. 5, 2002.
U.S. Appl. No. 10/088,258, Pearson et al., filed Mar. 13, 2002.
U.S. Appl. No. 10/643,306, Proudler, filed Aug. 18, 2003.

* cited by examiner

INFORMATION SECURITY SYSTEM

This invention concerns an information security system, primarily but not exclusively for use in commercial domains.

The invention concerns the simplification of information security systems, to reduce the cost and complexity to the domain in using the security service.

BACKGROUND

One reason why commercial enterprises are reluctant to embrace information security systems is that they require a complex on-line infrastructure, which is relatively difficult and expensive to maintain. A second reason is that applications that use security must be individually written to take advantage of security. This makes them more expensive to buy and costly to maintain. A third reason is that it is relatively simple for an operator to make a mistake and compromise security mechanisms.

Those skilled in the art of information security will be aware of the use of secrets as authorization and authentication information. Possession of a secret is taken as proof of the right to use or provide a service. In some systems, some secrets (such as passwords) are confidentially communicated between the user of a service and a provider of a service. Preferably, however, possession of a secret is proven without disclosing that secret. There are several such methods, generally involving the use of the secret as an input to an algorithm whose inputs are statistically impossible to deduce from its output. Challenge-and-response protocols involving hash algorithms (such as SHA-1) and symmetric or asymmetric cryptographic algorithms (such as 3DES or RSA) may be used for such purposes.

Such systems require the distribution of secrets between the parties. The distribution of secrets such as passwords and symmetric keys requires the use of channels that maintain the confidentiality of those secrets, e.g. a secure socket layer (SSL) protocol. There are numerous such distribution systems. Such secrets may be distributed using confidential channels provided by existing secrets (leading to a hierarchy of secrets). Such secrets may also be distributed through confidential "out-of-band" channels. Those skilled in the art of information security will be also aware of Public Key Infrastructures (PKI). Such systems are trust-based methods that distribute the public keys of asymmetric cryptographic algorithms. Preferably, one entity generates an asymmetric key pair and keeps secret the private key of that pair. The entity then uses a PKI to distribute the public key of that key pair. The PKI issues "digital certificates", which contain a statement of the public key of an entity and the label of that entity, all signed by the (secret) private key of some Certification Authority (CA). The public key of the CA is well publicized. So, when a third party receives a certificate, it can use the CA's public key to verify the contents of the certificate. When a certificate has been verified by such a method, the third party accepts that the stated public key belongs to the stated entity, because the third party trusts the CA. The third party can therefore use the public key from the certificate to verify the authenticity and integrity of data signed by the stated entity.

Some static PKI infrastructure is usually necessary, in order to identify entities. The complexity of the infrastructure rapidly increases, however, when multiple secrets have to be distributed and stored for each user/application pair, and especially when secrets have to be dynamically verified because each platform cannot store all access control information.

Existing security systems tend to have some security functions in the platform and some in individual applications. A platform might have shared security resources, such as a cryptographic accelerator, or a cryptographic library, or a store for secrets, or an SSL engine, for example. A security aware application might use those shared resources when performing its security functions. Those security functions include provision of confidentiality, integrity, authentication, non-repudiation, and so on. Such shared services and individual functions are well known to those skilled in the art of information security. Often each application requires its own security secrets. Duplication of security services is in conflict with preferred security practice, where the number of mechanisms that deal with security should be as small as possible and as tested as possible, to minimize the risk of bad design or poor construction.

The management of access to a service becomes increasingly difficult with increasing complexity and size of service. Each customer (user) is provided with authorization data to permit access to such a service. Methods of user authentication are well known to those skilled in the art. Such user authentication data may take the form of a simple password, biometric measurements, or (preferably) cryptographic keys, for example. Each computer platform providing the service must be capable of recognizing such authorized users, in order that the service is restricted to bona fide users. Each such computer platform must also be provided with authorization data that permits users to validate the service, in order that users may be convinced that a service is bona fide. Each such computer platform providing the service must also be provided with authorization data that permits each such computer platform to identify and validate each other such computer platform. This is necessary in order that a service can be distributed over multiple bona fide computer platforms. Such distribution is a commercial advantage because it enables greater reliability and more economically efficient load distribution. Clearly, a great deal of authorization information can be required. The need to distribute and manage this on-line authorization information is a significant drawback of existing methods of identification and verification at entry points to an electronic service. One such system is the well-known "Kerberos" system [see, for example: "Kerberos: an authentication service for computer networks", Neuman and T'so, IEEE Comms, September 1994]. This is a gatekeeper mechanism, used to verify access rights based upon long term secrets, and to distribute temporary secrets that provide short term access to resources.

Neither the commercial customer nor the commercial domain always benefit from the conventional security model described above; using secrets to identify a user, registering with the domain, obtaining a token to use the computing engine or service, and submitting the token in order to actually use the resource. The extra complexity costs both time and money, both of which are disadvantageous.

Those skilled in the art of information security will be also aware of the Trusted Computing Platform Alliance (TCPA) (details of which can be found at www.trustedpc.org and also in WO 00/48063, the contents of which are incorporated herein by reference). This industry body has defined the concept of a Trusted Computing Platform. Essentially, two roots-of-trust are built into each platform. One is the root-of-trust-for measurement, which is starts the process of measuring the software environment in the platform. The second is the root-of-trust-for-reporting, which stores and reports summaries of the measurements made by the root-of-trust-for measurement. The root-of-trust-for-reporting is usually called the Trusted Platform Module (TPM), because it is typically implemented as a single integrated circuit. The TPM protects its methods from interference. The TPM protects its secrets from observation and interference. The TPM contains several cryptographic functions, such as random number generation, key generation, encryption, and decryption. By means of a TCPA protocol, a TPM may obtain multiple anonymous trusted cryptographic identities. A CA chosen by the owner of that TPM grants each such trusted identity. Each such trusted identity can be used to cryptographically prove that certain data came from a trustworthy computing engine (the TPM). The TCPA specification referred to above also describes how an integrity response may be evoked from a platform. An integrity response provides evidence of the software state of that platform by reporting (amongst other things) the summaries of the measurements made by the root-of-trust-for measurement. An integrity response signed by a trusted identity is sufficient to prove that the integrity response from a platform can be believed (the private key belonging to the trusted identity is used to sign the integrity response from the platform containing that identity). The recipient of the integrity response must compare the response with a set of measurement values that should be obtained if the platform is in a trusted state. Methods of obtaining such comparative values are described in the TCPA specification referred to above, and will not be described here. It should be noted, however, that a signed statement of the summaries of the measurements made by the root-of-trust-for-measurement in a correctly operating platform is a convenient method to permit simple verification of an integrity response. The TCPA system relies upon a PKI; the system relies upon several certificates issued by several entities, including the manufacturer of the TPM, the manufacturer of the platform, a conformance laboratory [such as one that deals with conformance to the international "Common Criteria" security description], and the manufacturers of components of the platform (including the software in the platform). The TCPA specification discloses a method of measurement of the software state of a platform and the summarizing of that state as a number of Platform Configuration Registers (PCRs) inside a Trusted Platform Module, which is much better physically protected against interference and prying than is the rest of the platform. The TCPA specification describes a pair of commands called TPM_SEAL and TPM_UNSEAL. A TPM that receives the command TPM_SEAL (plaintext, pcr-index, pcr-value) encrypts the plaintext data along with the pcr-index and pcr-value. A TPM that receives the command TPM_UNSEAL (ciphertext) internally decrypts the ciphertext data to obtain the data [plaintext, pcr-index, pcr-value]. At this stage, the plaintext data is hidden inside the TPM. The TPM exports the plaintext data out of the TPM only if the current pcr-value of pcr-index in the platform matches the decrypted value of [pcr-index, pcr-value]. Hence data is revealed by the TPM only if the platform is currently in the state that was stated when the plaintext data was encrypted.

Existing security services use conventional methods to control and provide security services. Secrets are is distributed and loaded using key distribution systems and the facilities of a PKI. Each platform providing a service has its own secrets, and other such platforms use those secrets to identify and verify platforms that provide the service. Each user of a service is provided with secrets that enable it to access the service. Each platform providing a service needs proof, either individually or via another platform, that a prospective user actually has the secrets that prove the right to access the service. When TCPA Trusted Platforms have been deployed, existing services may be amended so that: (1) platforms may be identified by trusted identities, (2) platforms may verify each other's integrity before providing the service, using the service, or cooperating to provide the service.

A previous patent application (Trusted States) PCT/GB00/03613, the contents of which are incorporated herein by reference describes how a platform may exist in a variety of different states, each state optimised to ensure the validity of some electronic service. The integrity response provided by the platform serves to prove to a prospective user that the platform is in a particular state that is suitable to safely provide that service. Those skilled in the art of providing an electronic service will be aware that a service may be provided by a single platform or may be provided by one platform cooperating with at least one other platform, and different services may execute upon the same platform. A previous patent application (Performing a service on a computer) GB 00 20441.2, also incorporated herein by reference, describes the use of enhanced compartments to provide specification and isolation and audit of such services.

Existing security systems follow the military model, where users and computing engines have rights and privileges to perform certain actions and use certain data. There are disadvantages in that such a model is not always necessary for a commercial domain wishing to provide a computing resource. The domain might be providing a conventional electronic service, or might be providing just a computing engine upon which a user can execute his own data and applications. Indeed, the domain needs to provide such an engine service for itself, in order to partition its platforms as a set of arbitrary computing engines. An important concern of many such domains is that a user will pay for the resources consumed. This may be true even when the user belongs to the domain, because corporate accounting models often charge individual projects or individual departments for use of corporate resources. Of course, it is still possible that a domain needs just to confirm that the "customer" or user has the right to use a service and/or resource, and that no payment is required. This conventional security model is still appropriate for an employee of a company or a citizen of a country whose ID permits access to certain resources, as a matter of right.

A given user wanting a computing resource may wish to use applications and data provided by that resource, or may wish to obtain access to a virgin computing engine, or a computing engine executing some limited amount of software such as an operating system but few or no applications. The user may partition his processing requirements according to level of security/privacy, and distribute a task amongst domains according to those security/privacy criteria. Non-sensitive computing threads may be executed on arbitrary platforms such as individual workstations connected to a corporate network or to the Internet, rather than executed by a Data Center. A user (or even a domain) could take advantage of unused computing resources in one time zone when computing resources in another time zone are stretched. A private individual could execute sensitive data on his own platform and have a reciprocal agreement to execute insensitive data on an arbitrary platform belonging to a private individual who is asleep, and whose platform is idle. A roaming private individual could execute sensitive data on his own Personal Digital Appliance (PDA) and have an agreement to execute less sensitive data on an arbitrary platform in the logically local environment. A multinational corporation could use its worldwide desktop workstation resources for corporate processing when employees are not at their desks. The same non-sensitive thread could be executed on more than one platform, and the results compared, to provide increased confidence in the results obtained from arbitrary platforms.

It follows that there is an advantage in reducing the complexity of a traditional security system, even if the absolute level of security is less than that provided by a conventional security system. The basic platform should provide security, in order that applications can be ignorant of security. There should be rapid access to computing resources and services, without having to use gatekeeper authorization mechanisms.

The Invention

According to the invention a computer system comprises at least one platform containing a trusted entity and at least one label, the trusted entity being operable such that use of the or each label by the trusted entity is dependent on the presence or potential presence of a predetermined software state in the or each platform.

The at least one label may be adapted to indicate or advertise the presence or potential presence of the predetermined software state in the or each platform.

The presence of the predetermined software state may be an indication that the trusted entity is capable of providing a particular computing resource or service. The potential presence of the predetermined software state may be an indication that the trusted entity is capable of providing a particular computing resource or service.

The or each label may describe a service which can potentially be offered by the at least one platform.

The computer system advantageously provides a trusted apparatus which is operable to indicate when a particular computing resource or service may be available from a trusted entity.

The predetermined software state may include a particular configuration of computing resources and/or software described directly or indirectly by the or each label.

Labels in at least two platforms may be the same where the labels describe essentially the same configuration of computing resources and/or software. The labels in the two platforms may be essentially the same where the labels describe a particular configuration of computing resources and/or software related to the same distributed computing engine or distributed service.

The or each label may be widely published and one form of published label may be signed using a secret known to the platform. One form of published label may include descriptive information and is signed by a trusted entity. One form of published label may include descriptive information about the configuration of computing resources and/or software associated with the label and is signed by a trusted entity. One form of published label may include an offer to provide a configuration of computing resources and/or software associated with the label. The or each label may be signed using a secret known to the platform.

Reception by the platform of a cryptographic challenge incorporating one of said at least one labels from a second platform may cause the platform to determine whether the computing resources and/or software associated with said label can be provided by the platform.

Proof of possession of a label by a platform may be sufficient for another entity to cooperate with that platform for the purposes of using and/or providing the computing resources and/or software described by that label.

The computer system may be operable such that the right to use the computing resources and/or software described by the label depends on provision of one or more of:
proof of possession of a platform secret,
proof of possession of a user secret,
presentation of a non-secret authorisation value associated with a user whose use is known to be indicative of a request from the user,
presentation of a non-secret authorisation value associated with a user whose use is known to be indicative of agreement by the user to tender payment.

At least one platform may contain trustworthy integrated mandatory enforcement controls and security capabilities that transparently provide security and privacy to applications that are at least substantially ignorant of security and privacy, and preferably requires permission from at least one other platform to permit the flow of information to the resources allocated to said other platform from the resources allocated to the first-mentioned platform.

According to another aspect of the invention a computer system comprises at least one platform containing a trusted entity and at least one label, the trusted entity being operable such that use of the or each label by the trusted entity is dependent on the presence or potential presence of a predetermined software state in the or each platform, wherein the at least one label is adapted to indicate or advertise the presence or potential presence of the predetermined software state in the or each platform, and wherein the or each label is widely published and describes a service or resource which can potentially be offered by the at least one platform.

According to a further aspect of the invention a computer system comprises at least one platform containing a trusted entity and at least one label, wherein the label describes a predetermined software state in the or each platform and wherein the trusted entity is operable to use the label if the predetermined software state is described by the label is present or potentially present in the or each platform.

The trusted entity may sign the at least one label with a secret known to the platform only if the predetermined software state is present or potentially present in the at least one platform.

The at least one label may publicly disclose the predetermined software state in order to indicate the availability of a service or the resource on the or each platform.

According to the invention a computer system comprises at least one platform containing a trusted entity and at least one application, wherein the platform is operable to perform security functions for the computer system.

The platform preferably performs substantially all security functions and the applications preferably perform substantially no security functions.

The platform may be operable to apply mandatory security controls on communications from the computer system. Updates of security functions may be broadcast across the system to the at least one platform.

According to the invention a method for a computer system to signal the potential availability of a computing resource comprises providing a platform containing a trusted entity with at least one label, wherein the label is used by the platform only when a predetermined software state is present in the platform.

The label may describe the computing resource or service, which is defined by the predetermined software state.

An information security system may have a level of overall security slightly less than that of a conventional security system, depending on exact circumstances, but it is anticipated that the level of security is adequate for commercial purposes.

One aspect of the invention concerns the simplification of access control infrastructure that must be provided by the domain. The number of secrets in the domain is reduced to a minimum, yet individual users may still be identified and access to applications may still be individually controlled. At the same time, secure applications may be maintained across the domain by a broadcast mechanism, without having to deal with each platform as an individual. A mechanism of payment for resources is an integral part of the system. The requirement for a domain's on-line Public Key Infrastructure (PKI) is reduced, or even eliminated.

Another aspect is the transfer of all security mechanisms into the platform, away from applications. This simplifies applications and makes them less of a risk, because they are no longer required to properly implement security functions. This also makes it possible to apply security to legacy applications that are not aware of security. This also reduces risks, because the platform can provide mandatory security controls and because there is a reduction in the number of people required to design and build security mechanisms and controls.

This invention also recognizes that a major requirement of a user of such domains is that a user's data and applications on a computing engine do not "leak" to other users. If a user chooses to cache applications and information with a domain (for whatever length of time), the domain needs to provide access controls to those applications and data, such that only the user or his agent can use the applications and data.

This invention discloses an architecture that potentially eliminates the need for applications to be aware of security; minimizes the number of secrets in the platform (just one secret per platform); minimizes the number of secrets that identify the user (just one secret/value per user); permits all secrets to be installed at manufacture or initialisation, yet enables separate access controls for separate users to separate services or domains; enables the broadcast of maintenance information over all platforms in the domain, irrespective of platform identity; and does not necessarily need an on-line PKI infrastructure.

One main aspect of the invention is that a trusted entity in each of a plurality of platforms stores an identity secret of the platform and can be trusted to use that secret in conjunction with a label only when the platform is running the correct software to provide and/or take part in a particular service associated with that label.

A second aspect of the invention is the publication of global labels describing services and computing engines. Each global label preferably serves to identify the properties of an engine and/or service executing on that engine, and is preferably signed by a platform hosting the engine/service. Such labels and their interpretations may be published on a database, or on the World Wide Web, and may be available within a domain or globally. Such labels and their interpretations are preferably digitally signed by a trusted entity, preferably the domain itself. A platform preferably publishes the global labels of the engines and/or services that it has the potential to provide, even if the platform is not currently providing or in a position to provide that engine and/or service.

A third aspect of the invention is that a platform determines whether an engine and/or a service associated with a label can actually be provided only when a platform is requested to provide a particular engine and/or service associated with a label.

A fourth aspect of the invention is that a platform may provide and/or use an engine and/or a service associated with another platform based solely upon recognition of a label owned by that other platform.

A fifth main aspect of the invention is that a domain need not provide its own on-line PKI to validate users using secrets. Instead, the domain may either use an external on-line service that may use true secrets or may use quasi-secrets. Preferably the on-line service is one that can be used for user identification and more preferably the on-line PKI is one that can be used for on-line credit verification and payment.

A sixth aspect of the invention is that each of a plurality of platforms has an integral security service that provides security/privacy functions that drastically reduce (if not eliminate) the level of security functions that individual applications on the platforms must incorporate. The security service preferably enables an operator and/or a user to set the policy governing the level of security and privacy that will be provided for the engines and/or services that execute on the platform.

Each platform may be considered to have one or more cryptographic identities that are published only if the platform is in a certain state. Each cryptographic identity preferably consists of a different global label and the same shared secret for use in cryptographic algorithms. The identity and the mechanism that publishes global labels are preferably trusted, so that a third party believes that a platform is in the appropriate state to provide a particular engine and/or service when the platform exports that identity. Each such state preferably corresponds to an environment where mandatory controls are applied to a user's data and applications. These controls preferably isolate the user's data and applications as and when necessary. Such states may also correspond to services executing in such an environment.

All identities publicizing the same engine and/or service preferably have the same label, across all platforms, at least within the domain. This permits easy identification of platforms that can cooperate to provide those engines and/or services. A label may however be differentiated to indicate that a platform is executing the client portion of a client-server process, the server portion of a client-server process, or a peer portion of a peer-peer process, for example. As mentioned previously, all identities belonging to the same platform preferably use the same cryptographic secret, but have different labels. If there are privacy concerns, some or all identities belonging to the same platform could have different cryptographic secrets, but this increases complexity. Identities belonging to different platforms and/or systems must preferably have cryptographic secrets that are (statistically) different. Identities could be obtained via the TCPA protocol for obtaining platform identities, but are preferably preloaded or maintained directly by the domain itself.

Each identity secret preferably has an associated credential in the form of a digital certificate. That credential preferably attests to the name and/or nature of the platform containing the secret. That credential is preferably digitally signed by an entity that is considered trustworthy by third parties that wish to interact with the platform containing the identity secret. Preferably that trusted entity is the domain itself.

Each label preferably has an associated credential in the form of a digital certificate. That credential preferably attests to the name and/or nature of the engine and/or service described by that label. That credential is preferably digitally signed by an entity that is considered trustworthy by third parties that wish to interact with platforms providing that engine and/or secret. Preferably that trusted entity is the domain itself.

When a platform asserts that it can provide an engine and/or service, it preferably uses its identity secret to sign advertising data comprising at least the label describing that engine and/or service and an indication that the data is an advert. A platform posts or retracts appropriate adverts to/from a web site (for example), preferably according to whether it has the potential to provide the engine and/or services that are associated with that label. Each advert is preferably associated with an address (such as an IP address), to enable communications with the platform. The existence of such advertising does not imply that the platform will provide that service; only that it has the potential to provide that service. On receipt of a request, a platform preferably assesses its internal state, which has been measured in a reliable manner, preferably using TCPA mechanisms. The platform (strictly, the platform's TPM) preferably uses its identity secret to sign confirmation of the availability of an engine and/or service only if the platform's state is the correct state to provide the engine and/or service. Such confirmation data preferably includes at least the label describing that engine and/or service and an indication that the data is a confirmation.

Preferably both the user and the host use platforms whose architecture complies with this invention. Otherwise, one platform can provide or consume the service, but two platforms cannot cooperate, and/or cooperate to provide a distributed service to a third platform, in the manner envisaged in this invention.

If a user wishes to use a particular engine/service, the user or his agent preferably browses Web sites and searches for adverts of that particular type of engine and/or service. When the user finds a suitable label, it verifies the associated credentials and decides whether to trust the attestation. If the user trusts the attestation sufficiently for the task in hand, he preferably contacts the indicated platform in the indicated domain, states the target engine/service, presents any payment information or identification information that may be necessary, and presents any relevant policy information. A domain platform may decide whether or not to grant access based upon the user's credentials. Alternatively, the domain may grant access irrespective of the user's credentials.

After two platforms have agreed to cooperate, they preferably use conventional cryptographic methods such as the Diffie-Hellman (DH) protocol or the Secure Socket Layer (SSL) to provide confidentiality of communication between them. So the long-term identity secret inside the platform provides identification of the platform, while less permanent secrets created by the DH protocol or SSL, preferably provide confidentiality for the platform and/or for the engines and services provided by the platform. The user preferably sends to the domain a policy statement that states the security and privacy conditions that apply to the data and applications that will be executed by the domain. Such a policy will often indicate just that defaults are to be used. Such defaults are preferably that that all user data and applications are to be isolated from that of other users while they are on the host. The user may also intend to cache certain data and applications at the domain's platform. Then the host must isolate and store and protect such data and applications, such that only the user can access them, based upon the user's identity or the identity of the user's platform. These protection mechanisms do not require the involvement of the user. The domain may have trusted facilities that provide the necessary protection, probably but not necessarily involving cryptographic processes and the storage of secrets known only to the domain and its agents. The default policy may be that the user can gain access to those data and applications if the user's platform has the correct identity-label and the user presents the same generic payment/access information.

In one preferred method of use, domains are not aware of the identity of the actual user or users. Platforms constituting a distributed service or distributed computing engine in a domain will preferably cooperate with other platforms having a global label describing that distributed service or computing engine and signed by the domain. This model is particularly applicable to a group of platforms configured to belong to a particular set, such as a computing center for a domain.

In another preferred method of use, domains may require the presence of a user or users at a platform, or at a particular platform. In that case, the user's platform may pass the user's credentials to the domain. Preferably, however, the platform may export a particular label only when a certain user or users are present, it being the duty of the platform to verify that the user is actually present. The platform may use any of the conventional recognition methods to verify that a user is present, including passwords, biometrics, location, and security tokens such as smartcards. This model is particularly applicable when a user has a PDA and wishes to use computing resources in the domain. In one sense, the user's platform becomes the user's token as far as the network is concerned.

A platform requires a trusted mechanism to control the use of the identity secret and the global labels. The identity secret is preferably used by the TPM to sign a given label only if the platform is in the state that corresponds to the engine/service associated with the label. One suitable mechanism is an adaptation of the TCPA TPM_SEAL and TPM_UNSEAL mechanisms. Recall that a TPM exports UNSEALed plaintext data out of the TPM only if the current pcr-value of pcr-index in the platform matches the decrypted value of [pcr-index, pcr-value]. For the purposes of this invention, a label is used as the plaintext data, and the pcr-index and pcr-value are values that correspond to the software state of the engine/service associated with the label. Alternatively, a TPM could simply store the labels and PCRs, and be arranged to release them only when the correct software state is detected. Preferably a set of labels and PCRs is preloaded into the TPM before deployment of the platform. This reduces the burden on the user of a platform, since platforms are already supplied with a useful set of identities. Any upgrades or maintenance of these identities is preferably done by an entity, preferably the domain, which is trusted by all third parties that will interact with the platform. To perform an upgrade or do maintenance, the domain preferably determines the platform state that it wishes to correspond to some particular engine/service and broadcasts the same information to all platforms within the domain. Part of the broadcast is preferably the distribution of new or upgraded application/domain software. Another part of the broadcast is preferably the distribution of the corresponding new or upgraded software measurements (PCRs) to TPMs, such information being signed using the domain's private key. Each TPM preferably verifies the new information in the same way, using the same public key preloaded into the TPM at manufacture or initialization.

A label is preferably not confirmed by a platform identity unless the platform's software state is such that the platform enforces a minimum set of requirements (protection of engines and/or services), and contains an entity that does security processing and hides that security processing from applications on the platform. A label that does this but is not associated with a given engine/service is called the "root label", of the platform. It can be used for signing when the platform meets the minimum requirements. Production of signatures incorporating other labels preferably depends upon the presence of the computing engine and/or service associated with the label. When merely advertising, a platform preferably consists of any existing engines and/or services plus a superposition of potential engines and potential services. When a suitable challenge (a "quantum challenge" seems a suitable name, for obvious reasons) is received by a platform, it preferably forces the platform to decide what states can actually be supported by the platform. The platform may make all actual states visible to the challenger. Alternatively, the challenged platform may just instantiate the challenged engine/service (if possible), and provide a conventional crypto-response back to the challenger to confirm provision of the engine/service associated with the label.

When a first platform wishes to verify that a target platform will provide a particular service, it sends a "quantum challenge" to the target platform. The TPM in the target platform inspects its (PCR) state measurements. If the desired state exists, either because the platform enters that state on receipt of the challenge or is already in that state, the TPM is preferably able to UNSEAL the appropriate label and preferably signs its response (including the label) using the platform identity secret corresponding to that label. That is to say, it signs a nonce (received in the quantum challenge) plus the label corresponding to the desired service using the platform's identity secret (or the secret specifically allocated to that identity label). The first platform receives the response, checks the nonce and checks the label. The first platform then checks the signature, using the public key of a trusted Certification Authority, preferably the domain. This signature check may be done on-line, but is preferably done off-line using a public key loaded at manufacture or initialization. If all checks pass, the first platform believes that the target is running the particular service, and may decide to use or perform the service in cooperation with the target platform. Such a check may be all that is required if a verified platform identity and label provide sufficient trust. This may well be the case for a service that is internal to an organization and/or domain.

If payment but not authorization or identification is required to use or provide a service, and the requestor has money in an electronic form, the required amount of electronic money is preferably simply transferred between platforms at some point.

If payment is required to use or perform a service, the requester is required to provide payment information. This preferably takes the form of a credit card number or credit card signature. A credit card number may belong to the platform or may belong to a user. If it belongs to the platform, the number is preferably stored in the platform, preferably in a secure manner, such as that provided by a TPCA TPM_SEAL command. If the credit card number belongs to a user, it may be stored in the platform, preferably in a secure manner, and released after permission from the user. Alternatively, the user may provide the number to the platform. If a credit card signing secret belongs to the platform, the secret is stored in the platform, preferably in a secure manner such as that provided by a TPCA TPM_SEAL command, and used to sign a request. If a credit card secret belongs to the user, the secret may be stored in the platform and used to sign a request upon identification by the platform of the user, and/or of the user by the platform, and/or permission by the user. If a credit card secret belongs to a user, the secret may be stored in a token such as a smartcard, and used to sign a request upon identification by the platform of the user, and/or of the user by the platform. The protocol that must be used may be similar or the same as that used by a Point-Of-Sale terminal. The entity requesting payment then uses an existing credit agency, such as the VISA (Trade Mark) or Mastercard (Trade Mark) networks, to verify the payment authority.

If a user authentication is required, the same authentication is preferably used for all authorizations of that user. (Of course, multiple authentication/authorization values may be used, but this increases complexity.) Preferably this user authentication should also indicate the ability and desire to pay for the service. Note that, in this invention, the value that provides user authentication is not necessarily a true secret, merely a value that is guarded by the user and used in circumstances when the user wishes to give approval for some process, and is potentially visible to more entities than just the user and the verifier.

Preferably, therefore, this user authentication should have the properties of a credit card, whether a simple number (a value stored on a magnetic card, for example), or a signing secret (stored on a smartcard, for example).

If payment is not required but authorization and/or identification is required to use or perform a service, essentially the same process as for payment may be used. The difference being that the credit agency is used simply to verify the authorization/identification information, not to request payment. The credit agency might charge some money for providing this service. In effect, the credit agency is being paid for providing a PKI that would otherwise have to be provided by the domain. The protocol that must be used may be similar or the same as that used by a Point-Of-Sale terminal. Alternatively, a simpler protocol may be used. In the case of a card signing secret, the card might be requested to sign a nonce created by the domain and/or the credit agency, for example.

If payment is not required but authorization and/or identification is required to use or perform a service, a process similar to the same payment process may be used. The difference is that some identification and/or authorization server is used simply to verify the authorization/identification information, not to request payment.

When a platform is exhibiting the behaviour associated with a label, even just the root label, its software environment should preferably protect a user's data and applications from interference or prying by data and applications belonging to other users. A person skilled in the art will be aware that compartments and virtual machines are well suited to this task. Information from one compartment or virtual machine is prevented from unauthorized interference or prying on other compartments or virtual machines.

When a platform is exhibiting the behaviour associated with a label, even just the root label, its software environment preferably includes a security service that cooperates with the mechanism providing the compartments and/or virtual machines. This security service preferably performs all the security services on behalf of the engines and services running in the compartments and/or virtual machines. The security service preferably verifies the labels of other platforms that are communicating with this platform. The security service may check that incoming messages have correct signatures that contain the correct label. The security service may cooperate with the platform's TPM to sign out-going messages while incorporating the correct label. The security service preferably manages the Diffie-Hellman protocol between platforms and sets up and takes down secure channels as required. The security service preferably manages all storage of secrets used to store data and/or applications belonging to another platform and/or user inbetween active sessions. The security service also preferably performs other security services, as described in a prior patent application "Performing a service on a computer" (referred to above), on behalf of the applications. The security service is preferably managed by an application on its host computer, but preferably accepts policies from remote platforms governing the data and applications and engine and service for that remote platform on the local platform. The local management application preferably does not provide means to override those policies, but can refuse to execute processes on unacceptable terms.

One aspect of this invention is a modification that removes the differentiation between the client and the server, thus migrating the invention towards a peer-to-peer architecture. This aspect of the invention is that a client advertises its ability to participate in a particular service. The client preferably creates a signed certificate that states that the client is able to participate in a particular service. The certificate is preferably created by signing the label of the service using the identity of the client's TPM. The certificate preferably indicates that the client may be able to participate in the service, not that it wishes to, or is even able to, at the time that the certificate is posted. The client preferably posts that certificate to the advertising service. This process is analogous to the procedure followed by the server described above, where the server signs the label describing a service and posts the certificate to the advertising service, to indicate that the server might provide the service, not that the server will actually provide the service. The client preferably also posts to the advertising service an additional certificate, which is the public key of the client signed by a trusted domain, and is attestation by the domain that the client may be trusted to accurately state the services (labels) in which it may participate. Again, this mirrors the actions of the server described above.

Another aspect is a modification that provides a convenient revocation mechanism and permission mechanism. In the system described above, the server preferably posts to the advertising service the attestations by the domain that the server may be trusted to state the services (labels) in which they may participate. In this aspect of the invention, the domain preferably controls the advertising service and itself posts the attestation for both the client and the server. This permits the domain to dynamically control whether a particular computer is able to participate in a service. If the domain does not control the advertising service, the clients and servers preferably post attestations to the advertising service, but the domain preferably posts revocation certificates to the advertising service. Thus a computer, when visiting the advertising service, can discover whether a client and/or server might participate in a service, and whether the client and/or server is permitted to participate in a service. Both clients and servers preferably periodically visit the advertising service, and use the presence and/or absence of the attestation and revocation certificates to update their permissions to provide a participate in a given service.

All of the features described herein can be combined with any of the above aspects in any combination.

A specific embodiment of the present invention will now be described by way of example and with reference to the accompanying drawings, in which:

FIG. 1 $_{[gjp1]}$ is a schematic diagram illustrating the information in a computing platform;

FIG. 2 is a schematic diagram of the relationship between four computing platforms;

FIG. 3 $_{[gjp2]}$ is a schematic illustration of a world wide web service page showing potentially available services;

Figure 1:
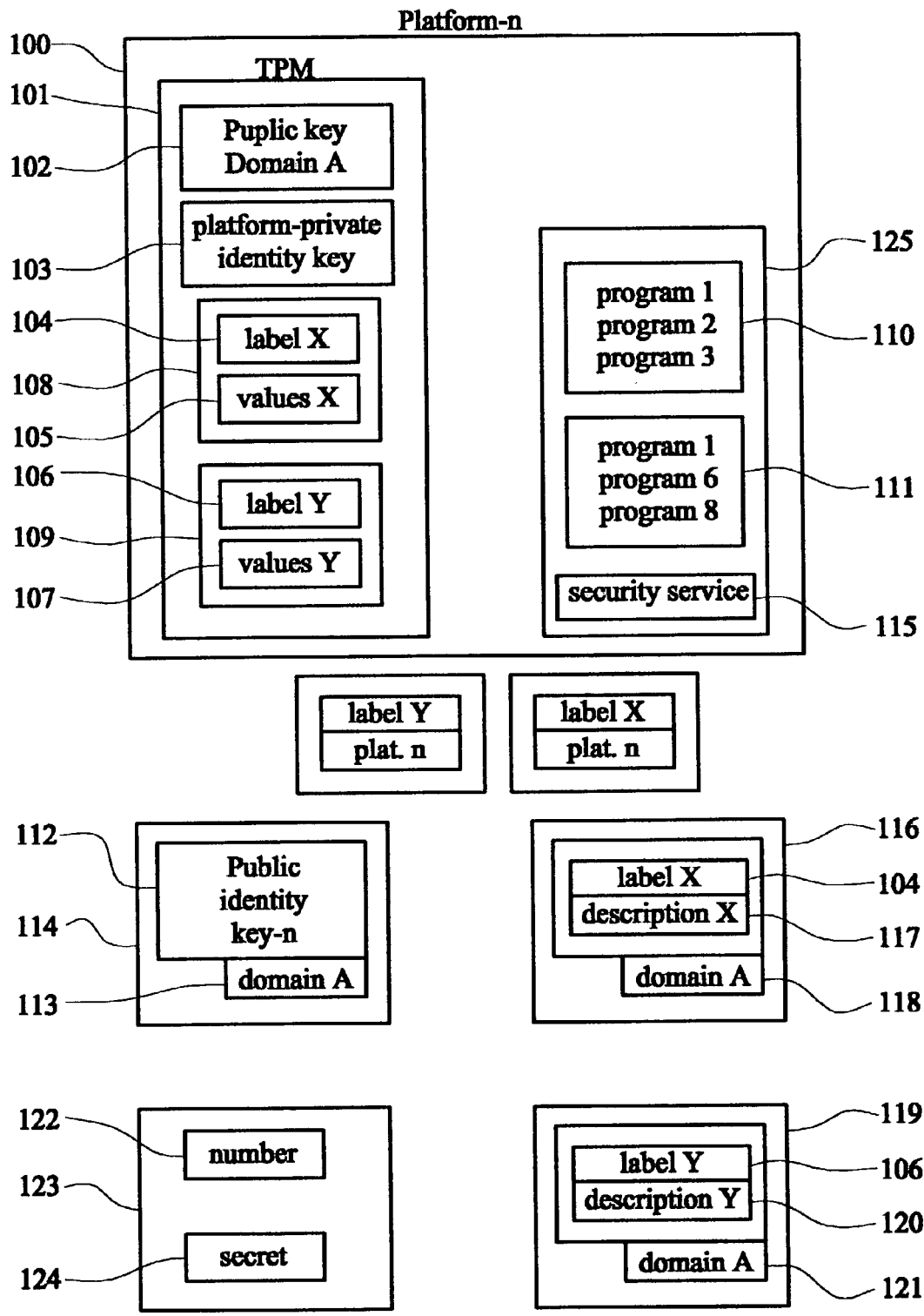

FIG. 1 illustrates the information that exists in a system consisting of platform-n 100, credential certificate 114, credential 116, credit card number 123 and credential 119, preferably either at manufacture or at initialization of the system. A TPM 101 in platform-n 100 contains a public key 102 of trusted domain-A. The TPM 101 also contains a statistically unique secret, which is a private (identity) key 103 of an asymmetric key pair, and used to prove the identity of the platform. A corresponding public (identity) key 112 is inside a credential (certificate) 114 that is signed 113 by trusted domain-A. The TPM 101 also contains labels 104,106 (but note that not all TPMs contain all labels). One label 104 indicates service-X. Another label 106 indicates engine-Y. The TPM 101 contains values 105 that correspond to measurements relevant to service-X. The TPM 101 contains values 107 that correspond to measurements relevant to engine-Y. Each label 104,106 of each engine/service is associated 108,109 with the set of values 105,107 that correspond to the measurements relevant to the engine/service. The platform-n 100 also contains programs 125. A set of programs 110 provides service-X. A set of programs 111 provides engine-Y. A set of values 105 associated with label 104 corresponds to the results of measurements that should be obtained if the platform 100 is executing the programs 110. The set of values 107 associated with label 106 corresponds to the results of measurements that should be obtained if the platform 100 is executing the programs 111. Each platform also contains all the programs 115 that are required to ensure that a platform is in the configuration that conforms to the meaning of a label. Label 104 is also inside credential 116 (in the form of an X.509 standard certificate) signed 118 by trusted domain-A and including a reference 117 to a description of service-X implied by label 104. Label 106 is also inside credential 119 (also an X.509 certificate) signed 121 by trusted domain-A and including a reference 120 to a description of engine-Y implied by label 106. A user 123 has either a credit card number 122 and/or a credit card signing-secret 124.

Figure 2:
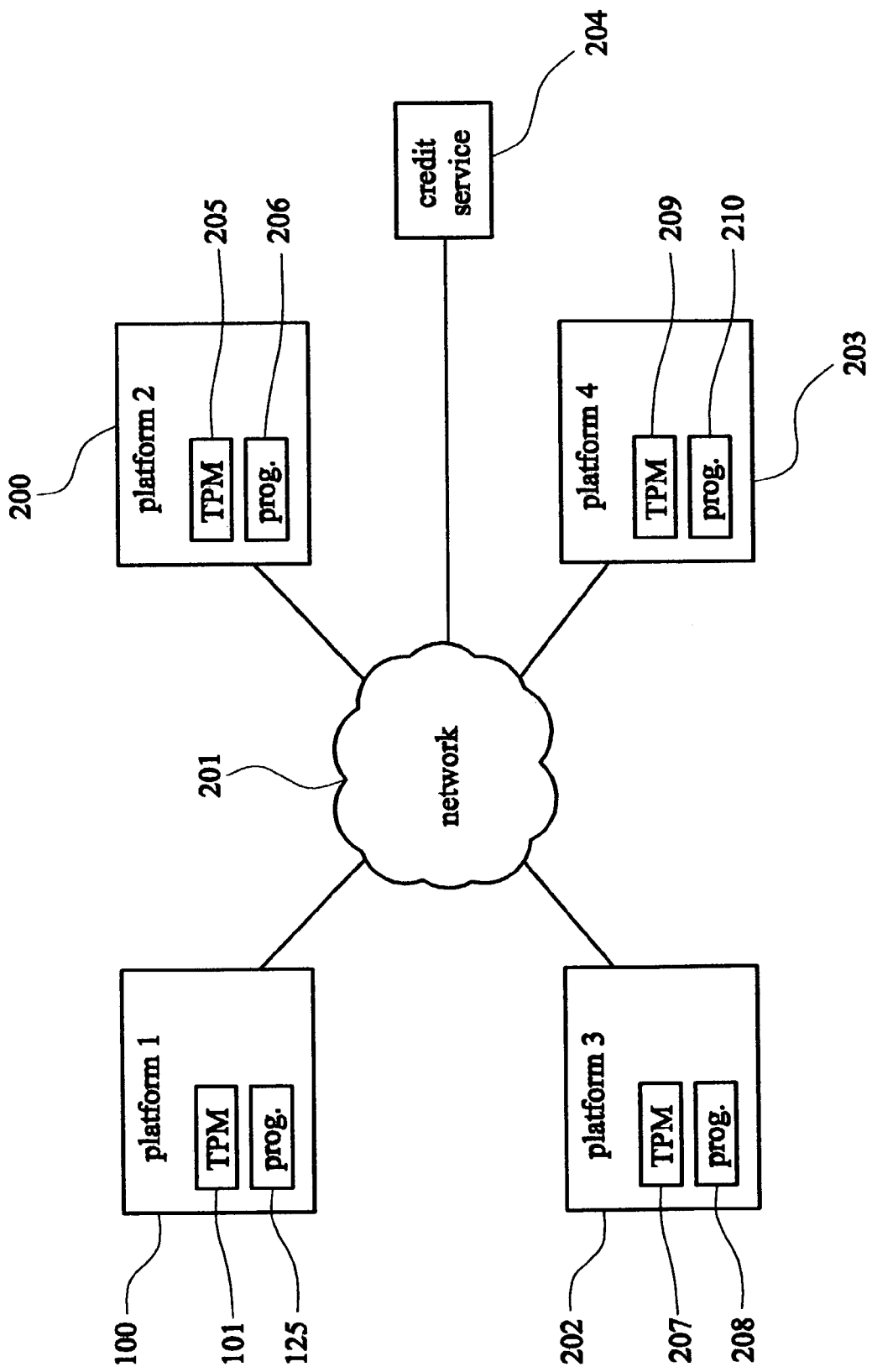

FIG. 2 illustrates four platforms, platform-1 100, platform-2 200, platform-3 202, platform-4 203. Platform-1 100 contains TPM 101 and programs 125. Platform-2 200 contains a TPM 205 and programs 206. Platform-3 202 contains a TPM 207 and programs 208. Platform-4 203 contains a TPM 209 and programs 210. Each TPM 101,205,207,209 is capable of attesting that the associated platform 100,200,202, 203 may be trusted to provide an engine and/or take part in a service. Also illustrated is an external credit verification service 204. A communication fabric 201 (such as the Internet or a Local Area Network, for example) connects all four platforms and the credit verification service. The programs 125, 206,208,210 in each platform 100,200,202,203 respectively provide at least a security service (e.g. 115 for platform-1 100 in FIG. 1) plus applications to provide services (e.g. 110,111 for platform-1 100 also in FIG. 1).

Figure 3:
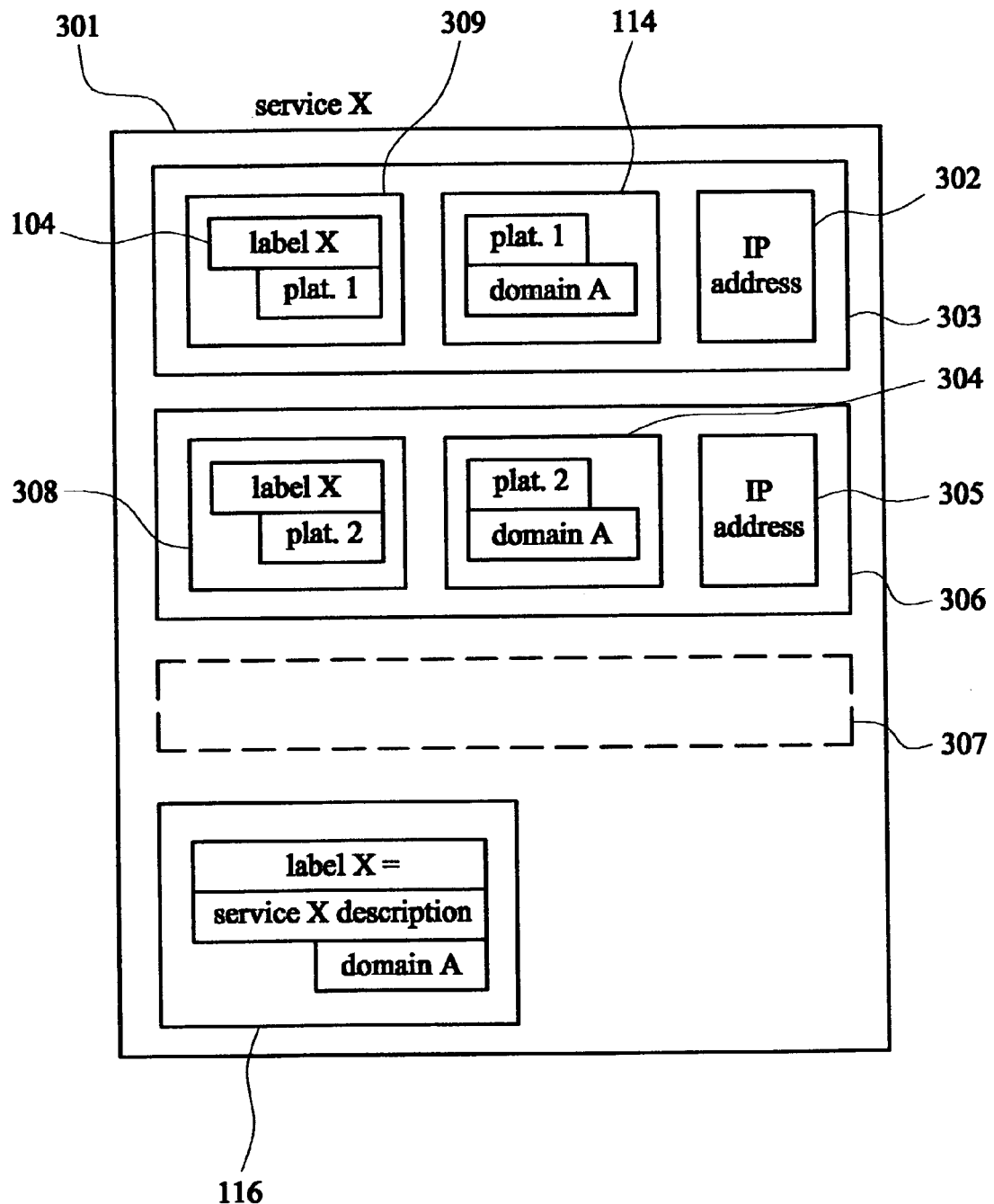

FIG. 3 illustrates a Web service-page. Each platform (100, 200, 202 203) advertises (using a Web page) the engines and services that it may potentially provide. The information on this particular service page 301 advertises platforms that can provide service-X. One set 303 of information advertises the potential availability of service-X from platform-1 100. The information includes the certificate 309 of label-X 104 signed by platform-1, the certificate 114 of platform-1's public key signed by domain-A, and the IP address 302 of platform-1 100. Another set 306 of information advertises the potential availability of service-X from platform-2 200. The information includes the certificate 308 of label-X signed by platform-2, the certificate 304 of platform-2's public key signed by domain-A, and the IP address 305 of platform-2 200. Similar information 307 from other platforms may be available. The information includes the certificate 116 of label-X and its description, signed by domain-A.

Figure 4:
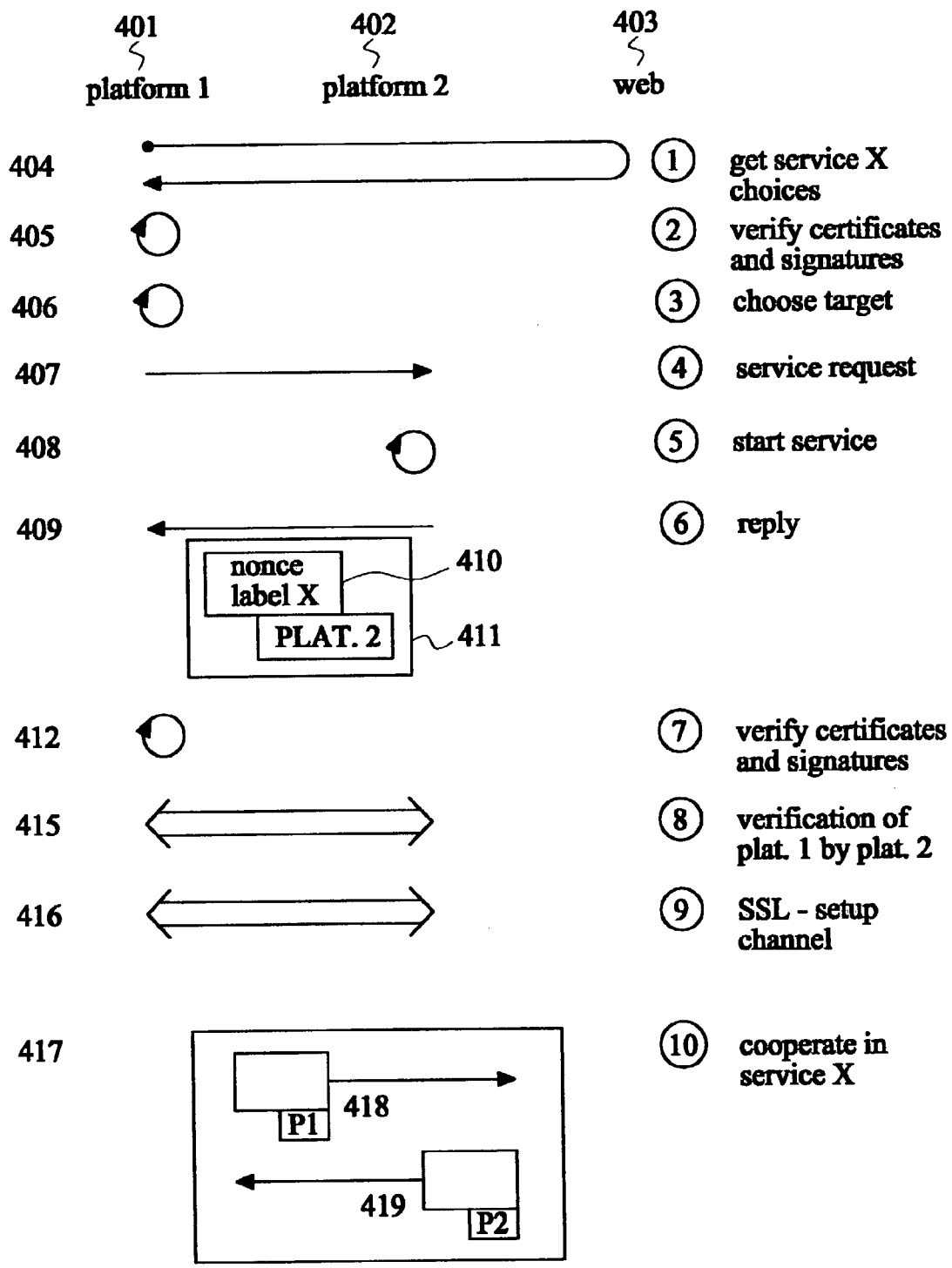
FIG. 4 is a flow chart illustrating the communication processes between first and second computing platforms.

FIG. 4 is a flow chart that illustrates the process by which platform-1 100 uses service-X on platform-2 200 after consulting a web page 301. Column 401 illustrates events at platform-1 100. Column 402 illustrates events at platform-2 200. Column 403 illustrates events at the web server.

In step-1 404, platform-1 100 visits the Web service page 301. The service-page 301 is widely publicized and/or available at a well known address, for example.

In step-2 405, platform-1 100 verifies that the certificates 309,114,308,304,116 and certificates from other platforms are correctly signed.

In step-3 406, platform-1 100 discovers that platform-2 200 is able to provide service-X, since trusted domain-A has signed the public key of platform-2 in the certificate 304, trusted domain-A has signed the label X and description of service-X in certificate 116, and the private key of platform-2 has signed the label of service-X in certificate 308.

In step-4 407, platform-1 100 contacts platform-2 200 using IP address 305 and requests the provision of the service corresponding to the label X of service-X, using a challenge from platform-1 to platform-2.

In step-5 408, platform-2 200 attempts to start service-X using the programs 110. The attempt is successful, so the measurements taken by the TPM 205 in platform-2 200 now indicate to the TPM 205 that it is permitted to use the label X 104 associated with service-X.

In step-6 409, platform-2 200 signs label X and the nonce 410 (from the incoming challenge) using its secret key, and sends the result 411 back to platform-1 100.

In step-7 412, platform-1 100 verifies the signature of platform-2 200 and hence verifies that platform-2 200 is now confirming the presence of service-X.

In step-8 415, platform-2 200 optionally performs a similar test on platform-1 100, to verify that platform-1 100 also contains service-X.

In step-9 416, platform-1 100 and platform-2 200 cooperate to setup a secure channel, using the Diffie-Hellman protocol.

In step-10 417, platform-1 100 and platform-2 200 provide and consume service-X, by executing the service and passing data 418,419 signed by their respective private keys and including label X.

Figure 5:
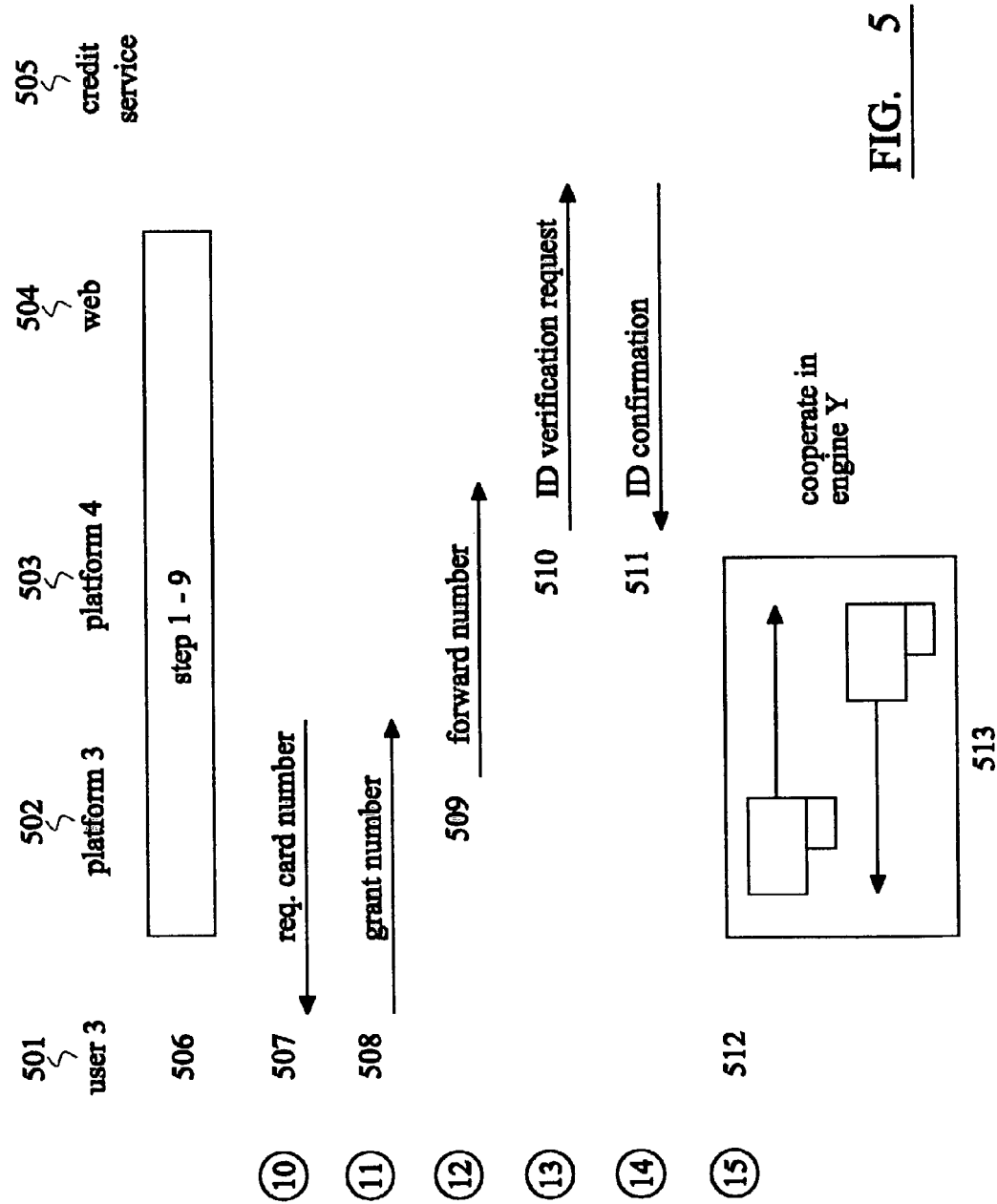
FIG. 5 is a flow chart illustrating the communication between third and fourth computing platforms.

FIG. 5 is a flow chart that illustrates the process by which platform-3 202 uses an engine-Y on platform-4 203. Column 501 illustrates events at a user of platform-3 202. Column 502 illustrates events at platform-3 202. Column 503 illustrates events at platform-4 203. Column 504 illustrates events at the web site. Column 505 illustrates events at the credit verification service 204. The protocol executes step 1 404 to step 9 416 of FIG. 4, until step 10 417, because the use of engine-Y requires user authorization.

In step-10 507 of FIG. 5, platform 3 202 asks its user to permit the use of a credit card number associated with the user.

In step-11 508, the user grants permission by entering the credit card number into platform-3 202.

In step-12 509, platform-3 202 sends the credit card number to platform-4 203 over the secure channel set up in step 9 416 between platform-3 202 and platform-4 204.

In step-13 510, platform-4 203 contacts the credit agency 204 by a protocol outside the scope of this invention.

In step-14 511, the credit agency 204 confirms to platform-4 203 the validity of the credit card number. In this case, the credit card agency 204 charges platform-4 203 for this service, although it could just have easily have charged the owner of the credit card number.

Finally, in step-15 512, platform-3 202 and platform-4 203 provide and consume engine-Y, by instantiating the engine on platform-4 and executing data and applications provided by platform-3 on that engine. Data 513 passing back and forth is signed by their respective private keys and includes label Y.

Figure 6:
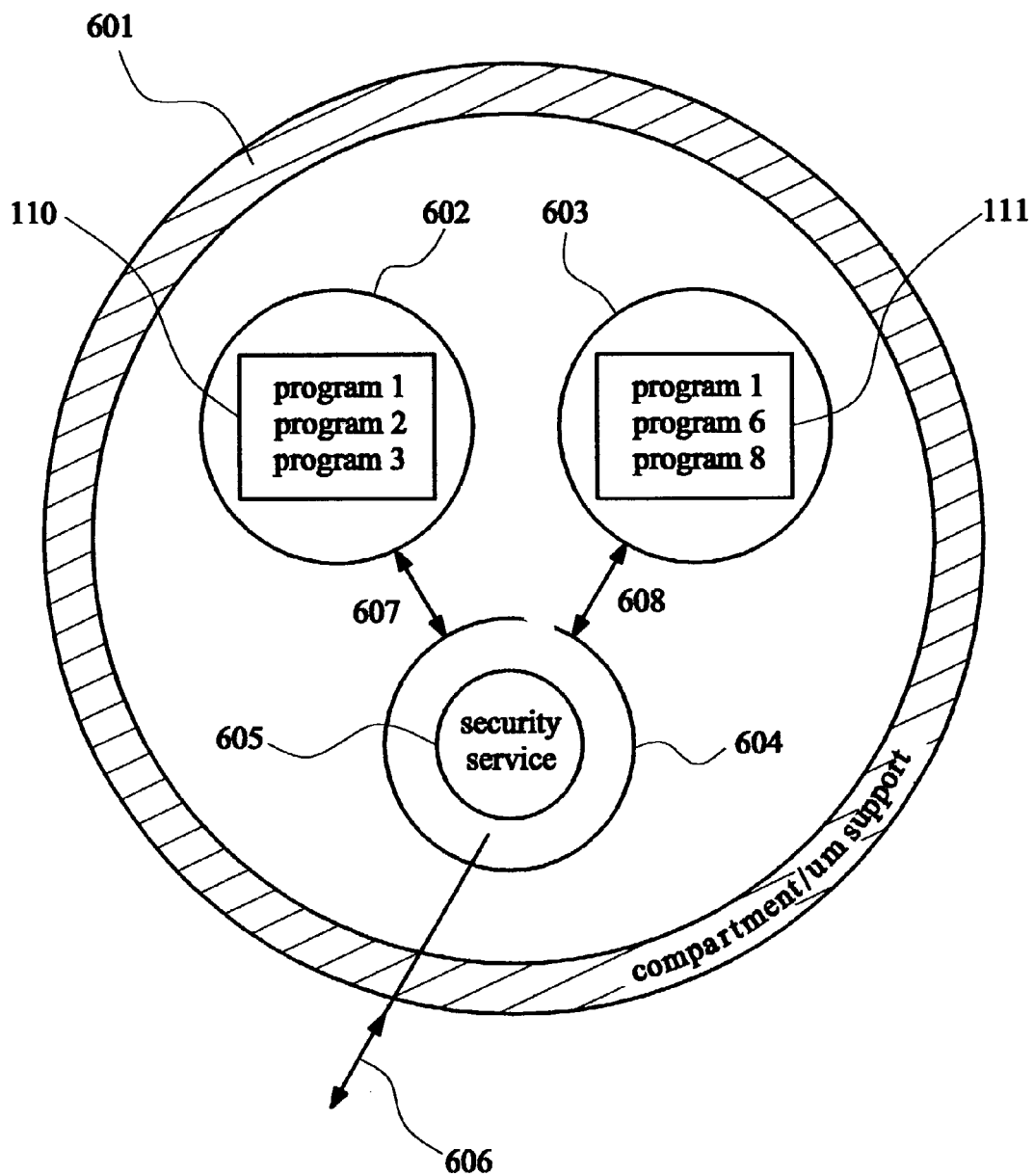
FIG. 6 is a schematic diagram of the architecture by which the second and fourth platforms provide a service/engine.

FIG. 6 illustrates the preferred architecture by which platform-2 provides service-X and platform-4 provides engine-Y. In this example, platform-2 200 and platform-4 203 execute service-X (provided by programs 1,2,3 110) in compartment-1 602 and execute engine-Y (provided by programs 1,6,8 111) in compartment-2 603. A security service 605 may also execute in a compartment 604. Other software processing 601, probably including kernel software, enforces and provides the compartment properties of the platforms 1 and 2. The security service 605 provides all security for service-X and engine-Y. The security service 605 intercepts messages 606,607 between the outside world and service-X. The security service 605 intercepts messages 606,608 between the outside world and engine-Y.

Figure 7:
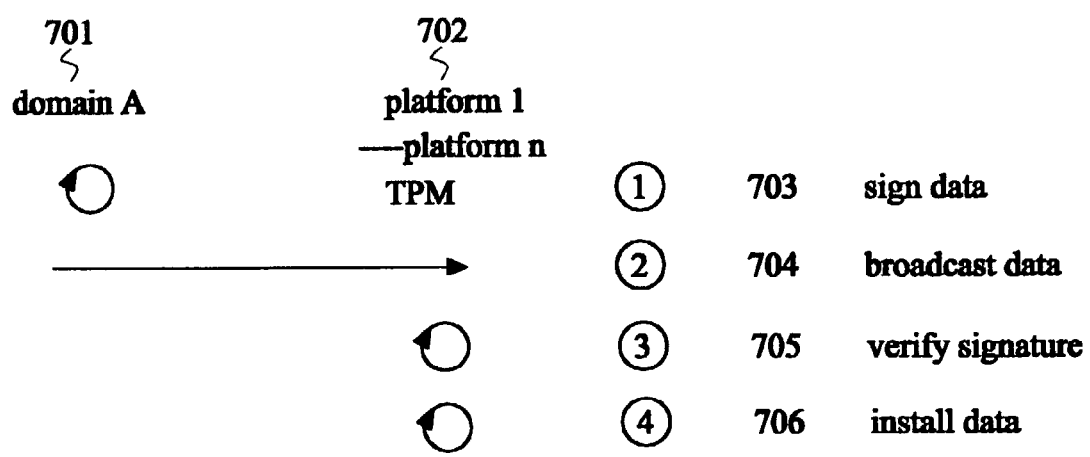
FIG. 7 is a flow chart illustrating the process by which a platform is maintained or upgraded.

FIG. 7 is a flow chart that illustrates the process by which a platform is maintained and/or upgraded. Column 701 illustrates events at domain-A. Column 702 illustrates events at the platforms in domain-A.

In step-1 703, domain-A signs new values that are to be associated with existing label-n, signs a new set of {label-p and its associated values} and signs new programs.

In step-2 704, domain-A sends those new data to all of the platforms in its domain.

In step-3 705, each platform's TPM 101, 205, 207, 209 verifies the signatures on the incoming data using the public key of domain-A that was stored in each TPM. In step-4 706, the programs are stored in the platform, the values associated with label-n in the TPM 101, 205, 207, 209 are replaced by the new values, and the new set of {label-p and its associated values} is installed in the TPM 101, 205, 207, 209.

The previous description assumes that a single domain both controlled the platforms and provided/managed the services. This does not have to be the case. A viable alternative is for one domain to control the platforms and a different domain to define/provide the services. Then one important change is that a platform, when using a label, should sign and provide a statement of the interpretation of the label by the platform. This is necessary in order that a second platform can reliably deduce the implications at a first platform of a particular label at that first platform. Platform-1 could provide this statement, for example, by modifying the credential 308 (currently a label signed by platform-1) so that the credential 308 includes the precise meaning of the label as implemented by platform-1. This might be done, for example, by modifying the credential 308 to include a reference to another credential 116, which is a signed description of the meaning of a label.

If different domains provide the platforms and the services, a service provided by the platform domain may be used to install and update the foreign services in the platforms.

If different domains provide the platforms and the services, an engine service provided by the platform domain may be used to provide services in the platforms on behalf of the service domain.

The system and protocol described herein provides significant advantages because the security requirements are considerably reduced and the total number of secrets in a system is reduced, thus giving advantageous simplification of the security system. Also the security infrastructure is kept out of the applications and engines to improve their efficiency.

The computing platforms described herein have been explained with particular reference to the TCPA specification. However, that specification is just an example of a trusted component of a computing platform and other types of trusted component are equally applicable to the invention described herein.

The invention claimed is:

1. A computing platform comprising:
   a trusted entity implemented in a computer; and
   storage that securely provides to the trusted entity both a label identifying a computing resource that the computing platform can provide, and integrity-metric reference values; wherein
   the computing platform responds to a request received at the computing platform for the computing resource, by generating a digitally-signed positive response only following the trusted entity having made a determination that the computing platform is in a software state providing the requested computing resource, the trusted entity making said determination by matching measured integrity metric values of the computing platform with the integrity-metric reference values.

2. A computer system comprising the computing platform as claimed in claim 1 in which the label is published within the computer system to indicate the presence or potential presence of the computing resource at the computing platform.

3. A computer system comprising the computing platform as claimed in claim 1, in which the predetermined software state includes one or both of a particular configuration of computing resources and software described directly or indirectly by the at least one label.

4. A computer system as claimed in claim 2 in which the label is signed using a secret known to the computing platform.

5. A computer system as claimed in claim 2, in which the label is published and one form of the published label includes descriptive information and is signed by a trusted entity.

6. A computer system as claimed in claim 2, in which the label is published and one form of the published label includes descriptive information about the corresponding software state of the computing platform and is signed by a trusted entity.

7. A computer system comprising the computing platform as claimed in claim 1 and a further entity implemented in the computer system, wherein the further entity upon receiving proof of possession of the label by the computing platform, cooperates with that computing platform for the purposes of using or providing the computing resource.

8. A computing platform as claimed in claim 1, wherein said computing resource is a service.

9. A computing platform as claimed in claim 1, wherein said computing resource is a computing engine.

10. A computing platform as claimed in claim 1, wherein said digitally-signed positive response takes the form of response data signed by the trusted entity using a secret known only to the trusted entity, the response data comprising said label.

11. A computing platform as claimed in claim 10, wherein the request includes a nonce and the computing platform extracts the nonce from the request and includes the nonce in the response data.

12. A computer system comprising a plurality of computing platforms as claimed in claim 11, in which the labels in at least two of the computing platforms are the same where the labels describe the same computing resource, which the at least two of the computing platforms can provide.

13. A computer system as claimed in claim 12, in which the labels in the at least two computing platforms are the same, and indicate a software state related to the same distributed computing engine or distributed service.

14. The computing platform of claim 1, wherein the trusted entity comprises a trusted component that is a hardware component of the computer.

15. The computing platform of claim 1, wherein the software state corresponds to an environment providing secure use of the resource by a user that sent the request to the computing platform.

16. A method for indicating the presence of a computing resource at a computing platform implemented in a computer that includes a trusted entity; the method comprising:
   securely storing for use by the trusted entity both a label identifying a computing resource that the computing platform can provide, and integrity-metric reference values;
   in response to the trusted entity having made a determination that the computing platform is in a software state providing the requested resource, the computing platform responding to a request received at the computing platform for the computing resource, by generating in the computer a digitally-signed positive response; and
   the trusted entity making said determination by matching measured integrity metric values of the computing platform with the integrity-metric reference values.

17. A method as claimed in claim 16, further comprising making availability of the computing resource at the computing platform known by publishing both:
   the label digitally signed by the computing platform, and
   data digitally signed by a trusted entity and comprising the label and a description of the computing source.

18. A method as claimed in claim 16, wherein said digitally-signed positive response takes the form of response data signed by the trusted entity using a secret known only to the trusted entity, the response data comprising said label.

19. A method as claimed in claim 18, wherein the request includes a nonce and the computing platform extracts the nonce from the request and includes the nonce in the response data.

* * * * *

UNITED STATES PATENT AND TRADEMARK OFFICE
CERTIFICATE OF CORRECTION

PATENT NO. : 8,909,555 B2
APPLICATION NO. : 10/296557
DATED : December 9, 2014
INVENTOR(S) : Graeme John Proudler It is certified that error appears in the above-identified patent and that said Letters Patent is hereby corrected as shown below:

Specification

In column 1, lines 3-4 approx., above "This invention concerns an information security system, primarily but not exclusively for use in commercial domains." insert
-- CROSS REFERENCE TO RELATED APPLICATIONS
The subject matter of the present application may also be related to the following U.S. Patent Applications: "Enforcing Restrictions on the Use of Stored Data," serial No. 10/049,213, filed February 5, 2002; "Computer Platforms and their Methods of Operation," serial No. 10/049,211, filed February 5, 2002; "Trusted Terminal," serial No. 10/088,258, filed March 13, 2002; and "A Method of Controlling the Processing of Data," serial No. 10/643,306, filed August 18, 2003. --, therefor.

Signed and Sealed this
Third Day of November, 2015

Michelle K. Lee
*Director of the United States Patent and Trademark Office*